United States Patent
Neighbor

(10) Patent No.: US 10,889,957 B2
(45) Date of Patent: *Jan. 12, 2021

(54) TEMPORARY SUPPORT STRUCTURE

(71) Applicant: OSMOSE UTILITIES SERVICES, INC., Peachtree City, GA (US)

(72) Inventor: Kristopher Mark Neighbor, Peachtree City, GA (US)

(73) Assignee: Osmose Utilities Services, Inc., Peachtree City, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/528,418

(22) Filed: Jul. 31, 2019

(65) Prior Publication Data
US 2019/0352879 A1 Nov. 21, 2019

Related U.S. Application Data

(63) Continuation of application No. 15/994,399, filed on May 31, 2018, now Pat. No. 10,385,534.
(Continued)

(51) Int. Cl.
*E02D 37/00* (2006.01)
*F16M 11/24* (2006.01)

(52) U.S. Cl.
CPC .......... *E02D 37/00* (2013.01); *F16M 11/24* (2013.01); *E02D 2220/00* (2013.01)

(58) Field of Classification Search
CPC .......... E04H 12/2253; E04H 12/2269; E04H 12/2292; E02D 5/64; E02D 37/00; E02D 2220/00; F16M 11/24
See application file for complete search history.

(56) References Cited

U.S. PATENT DOCUMENTS 2,474,250 A * 6/1949 Howard ................. F16M 11/08
52/114
2,687,863 A * 8/1954 Vogt ..................... H01Q 1/1221
248/515
(Continued)

FOREIGN PATENT DOCUMENTS

CA 2841477 A1 7/2014
JP 3091146 B2 9/2000
(Continued)

OTHER PUBLICATIONS

PCT/US2018035458 International Search Report and Written Opinion dated Sep. 4, 2018.

*Primary Examiner* — Benjamin F Fiorello
(74) *Attorney, Agent, or Firm* — Troutman Pepper Hamilton Sanders LLP

(57) ABSTRACT

The disclosed technology includes temporary support structures for use in the repair of a transmission tower. A typical transmission tower includes a tripod that receive the load of the tower and distributes it to piles embedded in the ground. A temporary support structure may temporarily remove the load of the transmission tower from the tripod to allow the tripod to be removed and replaced with a new tripod. A temporary support system may include a pile temporary support system, a beam support structure supported by the pile temporary support system, and a flower pot adapter lifting assembly configured to attach to a portion of the transmission tower to transfer a load of the transmission tower to the beam support structure.

19 Claims, 11 Drawing Sheets

Related U.S. Application Data

(60) Provisional application No. 62/512,944, filed on May 31, 2017, provisional application No. 62/513,014, filed on May 31, 2017, provisional application No. 62/513,072, filed on May 31, 2017, provisional application No. 62/513,097, filed on May 31, 2017.

(56) References Cited

U.S. PATENT DOCUMENTS

| | | | | | |
|---|---|---|---|---|---|
| 3,430,910 | A | * | 3/1969 | Bowden | E04G 25/06 254/100 |
| 4,036,466 | A | * | 7/1977 | Van Meter | E04G 11/38 249/18 |
| 4,339,899 | A | * | 7/1982 | Klenk | E02D 27/42 52/157 |
| 4,413,455 | A | * | 11/1983 | Jenkins | E04H 12/34 248/346.03 |
| 4,462,197 | A | * | 7/1984 | D'Alessio | E04G 1/12 182/178.5 |
| 4,841,708 | A | * | 6/1989 | Johnston | E04G 1/12 249/18 |
| 5,680,739 | A | | 10/1997 | Cercone et al. | |
| 5,813,800 | A | | 9/1998 | Doleshal | |
| 8,734,058 | B1 | | 5/2014 | Schmidt | |
| 2006/0245831 | A1 | | 11/2006 | Anderson | |
| 2011/0135400 | A1 | | 6/2011 | Hall | |
| 2013/0019792 | A1 | * | 1/2013 | Jahnig | B63B 1/04 114/267 |
| 2013/0294841 | A1 | | 11/2013 | Fey | |
| 2014/0311083 | A1 | * | 10/2014 | Madril | E04H 12/347 52/741.14 |
| 2015/0021529 | A1 | | 1/2015 | Gregory et al. | |
| 2016/0016767 | A1 | | 1/2016 | Jones | |
| 2016/0298310 | A1 | | 10/2016 | Deroos | |
| 2018/0347745 | A1 | | 12/2018 | Neighbor | |

FOREIGN PATENT DOCUMENTS

| | | |
|---|---|---|
| JP | 428665 B2 | 6/2009 |
| JP | 5464589 B2 | 4/2014 |
| KR | 101025239 B1 | 3/2011 |
| NL | 1004568 C1 | 5/1998 |

* cited by examiner

TEMPORARY SUPPORT STRUCTURE

CROSS-REFERENCE TO RELATED APPLICATION

This application is a continuation of U.S. patent application Ser. No. 15/994,399, filed 31 May 2018, which claims the benefit of U.S. Provisional Patent Application Nos. 62/512,944, 62/513,014, 62/513,072, and 62/513,097, all filed 31 May 2017, all of which are incorporated herein by reference in their entirety as if fully set forth below.

BACKGROUND

Many electrical transmission utility companies utilize guyed lattice tower assets supported by a tripod beam that bears on steel piles (e.g., helical piles), such as 3" small diameter steel pipe piles or 8" large diameter steel pipe piles. These towers are often located in remote wetlands or tidal areas that have fluctuations in the tidal water surface elevation that can lead to accelerated corrosion of the tripod support beam, as well as brackets and adapters positioned at the interfaces between the bottom of the tripod support beam and the top of the support piles. When the tower foundation is in a severe state of deterioration, traditionally a utility's best option was to replace the tower, which is costly and may cause significant environmental disruption to the environmentally sensitive areas in which many such towers are located. The many challenges associated with replacement of such towers, such as environmental access, environmental preservation, critical service requirements, and budgetary issues can make tower replacement a very impractical solution. Therefore, a low impact, moderate cost solution that enables the repair of a tower tripod beam, bracket, and/or adapter without the need to replace the tower would provide economic and environmental benefits. In some cases, a tripod beam of a guyed lattice tower may be so severely deteriorated that it may not be practical to reinforce the structure of the tripod beam, but instead it may be necessary to replace the tripod beam entirely. Accordingly, there is a need for an apparatus that may allow for the replacement of the tripod beam, as well as the associated brackets and adapters, without moving the tower or removing the tower from service.

SUMMARY

Some or all of the above deficiencies may be addressed by certain embodiments of the disclosed technology. For example, embodiments of a temporary support structure ("TSS") as described herein may enable the replacement of the tripod beam, as well as the associated brackets and adapters, without moving the transmission tower or removing the tower from service. The TSS may also enable comprehensive pile repair, such as removing and replacing sections of piles, while the tower load path has been transferred to the TSS. The TSS may be capable of supporting the entire load of a tower, as well as lifting the entire tower.

In general, a TSS may allow a guyed lattice mast tower to be temporarily supported (and raised, if required) independent of the existing foundation piles so that the tripod beam, the brackets, and/or pile adapters of the tower can be replaced, and the upper portions of the piles can be restored. In some embodiments, the TSS may include a pile temporary support system (PTSS) that is a bracket system that allows piles to be driven with diagonal cross bracing attached. The PTSS may allow temporary supports to transfer tower loads to an independent pile system.

According to some embodiments, a TSS may utilize a PTSS to support the temporary support bearing frame of the TSS. A PTSS may have temporary piles that have upper and lower brackets for supporting bracing. For example, the lower bracket of a temporary pile may have a brace attached to the bracket and then the lower bracket of the temporary pile may be driven into an inaccessible location (e.g., below the water line of a swamp) as the pile is driven into the ground, however it may be positioned in such a fashion that the brace extends diagonally upwards out of the inaccessible location (e.g., the brace extends out of the water line at a diagonal angle). At a later point, the cross bracing may be attached to adjacent temporary piles such that bracing attached to a lower bracket on one temporary pile may be attached to an upper bracket of an adjacent pile. After the temporary piles are installed into the ground with the appropriate bracing attached, pile caps may be installed on top of the temporary piles to support the temporary support bearing frame of the TSS. In some embodiments, the pile caps may have bolt holes that align with bolt holes or attachment slots in the bottom of a bearing beam that is attached to the top of the pile cap. Temporary support bearing beams may then be installed on top of the pile caps. In some embodiments, the temporary support bearing beams may form a triangle with three sides, wherein each side is positioned to be approximately perpendicular to a corresponding arm of the existing tripod beam, as shown below. A transfer beam may be installed on top of each pair of adjacent temporary support bearing beams as shown below. In some embodiments, an under-hung temporary tripod beam may be installed under the existing tripod beam to provide additional support if the existing tripod beam is so degraded that it may not support the flower pot adapter and beams. A flowerpot adapter may be installed above the existing tripod beam to transfer the load of the tower to the TSS. The flowerpot adapter may be held by, for example, three jack supports, where each jack support is positioned to rest on top of a corresponding transfer beam as shown below. Once the load of the tower is transferred to the TSS, the existing tripod, brackets, and pile adapters may freely be replaced.

According to an example embodiment, a temporary support structure is provided. The temporary support structure may include a pile temporary support system including a plurality of piles. Each of the plurality of piles may have a base portion that may be configured to be installed into the ground and a pile cap on a top end of the pile. The temporary support structure may include a beam support structure configured to be installed on top of and supported by the pile temporary support system. The beam support structure may include at least a first plurality of support beams. The temporary support structure may also include a flower pot adapter lifting assembly configured to attach to a portion of a transmission tower and to be installed on top of the beam support structure to transfer a load of the transmission tower to the beam support structure and onto the pile temporary support system.

According to an example embodiment, a method of removing the load from a tripod of a transmission tower is provided. The method may include assembling a pile temporary support system including a plurality of piles around a base of a transmission tower. Each of the plurality of piles may have a base portion installed into the ground and may have a pile cap on a top end of the pile. The method may include assembling a beam support structure on top of the pile temporary support system such that the pile temporary support system supports the beam support structure. The beam support structure may include at least a first plurality of support beams. The method may include positioning a flower pot adapter lifting assembly on top of the beam support structure such that the beam support structure supports the flower pot adapter lifting assembly (i.e., the load of the flower pot adapter lifting assembly may be transferred to the beam support structure). The method may further include attaching the flower pot adapter lifting assembly to a flower pot of the transmission tower. The flower pot may be positioned above the tripod (i.e., the existing tripod beam) and may be configured to hold the guyed lattice mast of the transmission tower. Following the execution of these steps, the load of the transmission tower may be transferred from the transmission tower to the flower pot adapter lifting assembly, from the flower pot adapter lifting assembly to the beam support structure (e.g., from the flower pot adapter lifting assembly to transfer beam assembly and from the transfer beam assembly to the bearing beam assembly), and from the beam support structure to the pile temporary support system.

Other embodiments, features, and aspects of the disclosed technology are described in detail herein and are considered a part of the claimed disclosed technology. Other embodiments, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
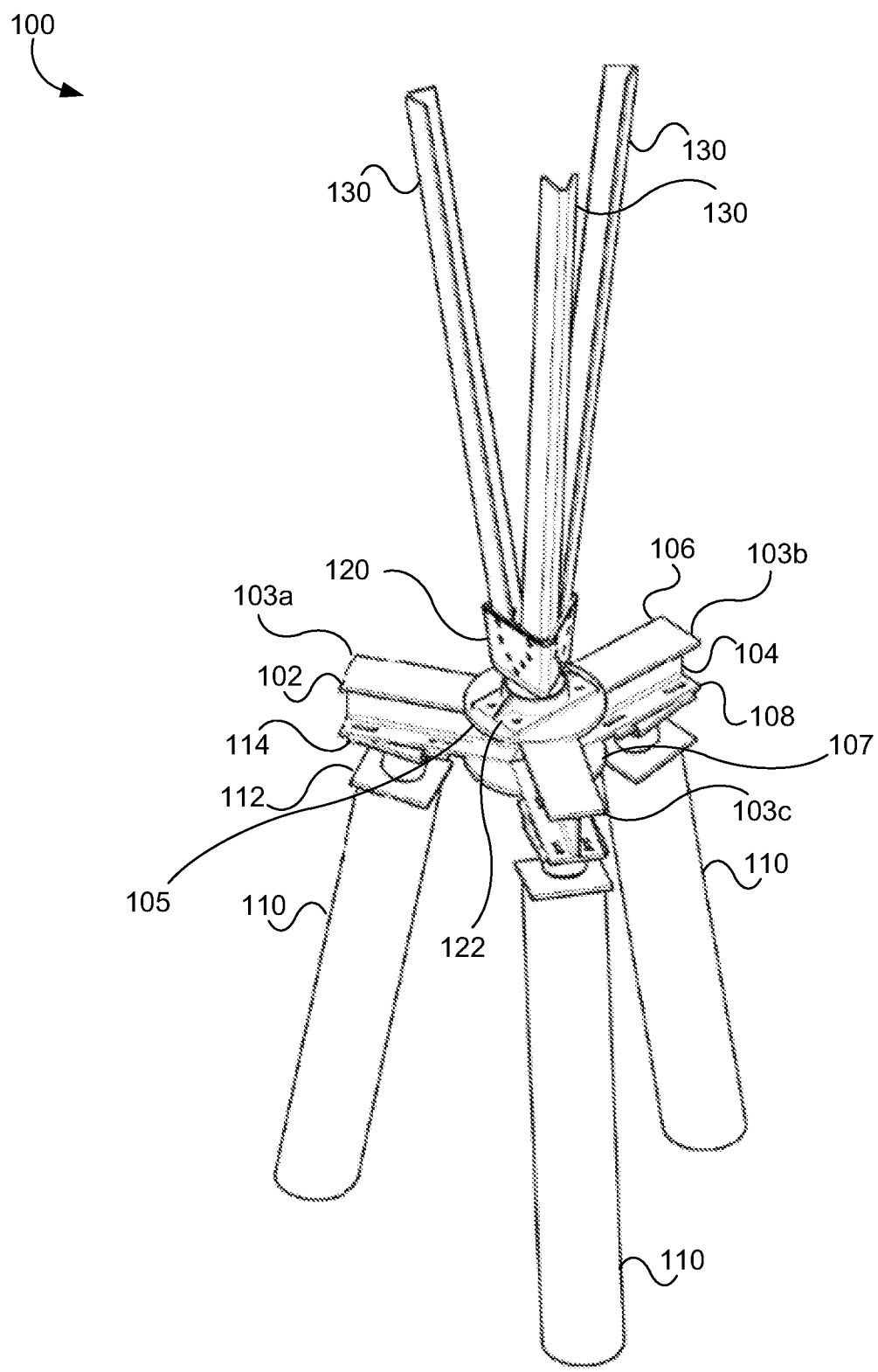
FIG. 1 is a perspective view of a transmission tower tripod and large pile configuration, according to an example implementation.

Embodiments of the disclosed technology include a temporary support structure and methods that can be used to repair a transmission tower and, in particular, may be used to replace a degraded tripod installed in the transmission tower without requiring removal of the tower from service or replacement of the tower itself. Embodiments of the disclosed technology include a temporary support structure having an underhung tripod assembly to allow replacement of a tripod that is not capable of supporting the flower pot adapter and screw back beams during the assembly of the temporary support structure, as described herein. Embodiments of the disclosed technology further include a temporary small pile strut assembly to stiffen small piles used to support the currently installed tripod during the process of removing said tripod. Further, although this disclosure is generally directed towards describing the repair or strengthening of transmission towers having a three-sided flower pot, it should be understood that the temporary support structure described herein may be used to repair a wide variety of other types of structures, towers, poles, or the like, including transmission towers have a four-sided flower pot (or any other number of sides) by modifying the flower pot adapter lifting assembly described herein to allow it to securely attach to the outer surface of a portion of said other type of structure, thereby allowing the load of the structure to be supported by the temporary support structure and providing the opportunity to replace parts of the structure from which the load has been temporarily removed.

According to certain embodiments, a temporary support structure according to the embodiments disclosed herein may be used temporarily to remove the load of a transmission tower from an installed tripod and place the load on the temporary support structure to allow removal and replacement of the installed tripod. Embodiments of the temporary support structure described herein may be used in conjunction with transmission towers having a large pile configuration and/or transmission towers having a small pile configuration. In addition to allowing removal and replacement of the installed tripod, other repairs may be made to the tower during installation, such as for example, trimming of corroded portions of piles and replacement of decaying pile adapters and/or pile brackets. According to some embodiments, the temporary support structure may securely support the load of the transmission tower about the flower pot of the tower. As will be appreciated by those of skill in the art, a flower pot may be a container that is configured to securely hold the legs of the transmission tower. Once a tripod has been removed and a new tripod has been attached to the piles and/or pile adapter/brackets, the flower pot that is being held up by the temporary support structure may be lowered into and received by a flower pot adapter positioned on top of the new tripod, such that the load of the tower may be transferred from the temporary support structure to the newly installed tripod. The flower pot may be lowered by, for example, turning threaded screws of a plurality of screw jacks coupled with the flower pot to lower the flower pot. Once the flower pot has been secured to the flower pot adapter of the new tripod, the temporary support structure may be deconstructed and removed.

Some embodiments of the disclosed technology will be described more fully hereinafter with reference to the accompanying drawings. This disclosed technology may, however, be embodied in many different forms and should not be construed as limited to the embodiments set forth therein.

In the following description, numerous specific details are set forth. However, it is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Various systems and methods are disclosed for removing the load of a transmission tower from an installed tripod to allow for replacement of the tripod, and will now be described with reference to the accompanying figures.

As described herein, embodiments of the disclosed technology include temporary support structures for supporting the load of a transmission tower to allow for removal and replacement of a degraded tripod. As will be appreciated by those of skill in the art, the base of a transmission tower may be commonly supported by a tripod having a plurality of arms (e.g., three arms) that are supported by piles that have been installed in the ground. For example, FIG. 1 shows a large pile configuration in which a transmission tower base 100 includes a tripod 102 having three tripod arms 103a,b,c that are supported by large piles 110. Each tripod arm 103 may include a top plate 106 that is connected to a bottom plate 108 by a tripod web 104. According to some embodiments, the top plate 106 and bottom plate 108 of a tripod arm may be approximately the same shape and may be positioned in parallel to one another such that they are both joined by the tripod web 104 at an approximately perpendicular angle. According to some embodiments, the top plate 106 and bottom plate 108 of a tripod arm 103 may be rectangular-shaped plates and the tripod web 104 may be positioned at an axis that corresponds to a center line of the top plate 106 and/or bottom plate 108 that spans the length of the top/bottom plates 106, 108. In some embodiments, the tripod web 104 may be a substantially planar plate. According to some embodiments, the tripod arms 103a,b,c may be joined or welded together by one or more of an upper member 105 and a lower member 107, forming the tripod weldment, referred to herein as "tripod 102." For example, as shown in FIG. 1, each of the upper member 105 and lower member 107 may be a plate, such as a circular plate or other suitably shaped plate, that may be attached to a portion of each of the tripod arms 103a,b,c. According to some embodiments, the upper member 105 and/or lower member 107 may include one or more apertures configured to align with apertures in the top plate 106 and/or bottom plate 108 of a tripod arm 103 so that they may be attached to one another via bolts, screws, fasteners, or the like. According to some embodiments, the upper member 105 may have one or more apertures configured to align with apertures of the flower pot socket 122 to allow the flower pot socket 122 to be attached to the upper member 105. The tripod 102 may traditionally be made of metal, such as steel or another such suitable material.

According to some embodiments, a transmission tower base 100 may include one-piece pile adapters 112 and brackets 114 that are positioned between the tops of the large piles 110 and the bottoms of each tripod arm 103a,b,c. The pile adapters 112 and brackets 114 may serve to create a transition connection between the respective piles 110 and the tripod 102. During the original installation, the piles 110 may be positioned or field trimmed such that the brackets 114 may be positioned at an approximately equal height so that the tripod 102 may be positioned approximately parallel to the ground in order to provide a flat base to serve as support for the transmission tower. A bracket 114 that is mated with a pile adapter 112 may be secured to the bottom of a tripod arm 103 by being bolted, screwed, fastened, or otherwise secured together. Transmission tower legs 130 may be received by a receiving member designed to securely receive and stabilize the transmission tower legs 130, such as a flower pot 120. The flower pot 120 may be positioned in and/or secured to a flower pot socket 122 that is positioned on top of the tripod 102 and is configured to securely receive the base of the flower pot 120. According to some embodiments, the flower pot socket 122 can be secured (e.g., bolted, screwed, fastened, etc.) to the top of the tripod 102.

Figure 2:
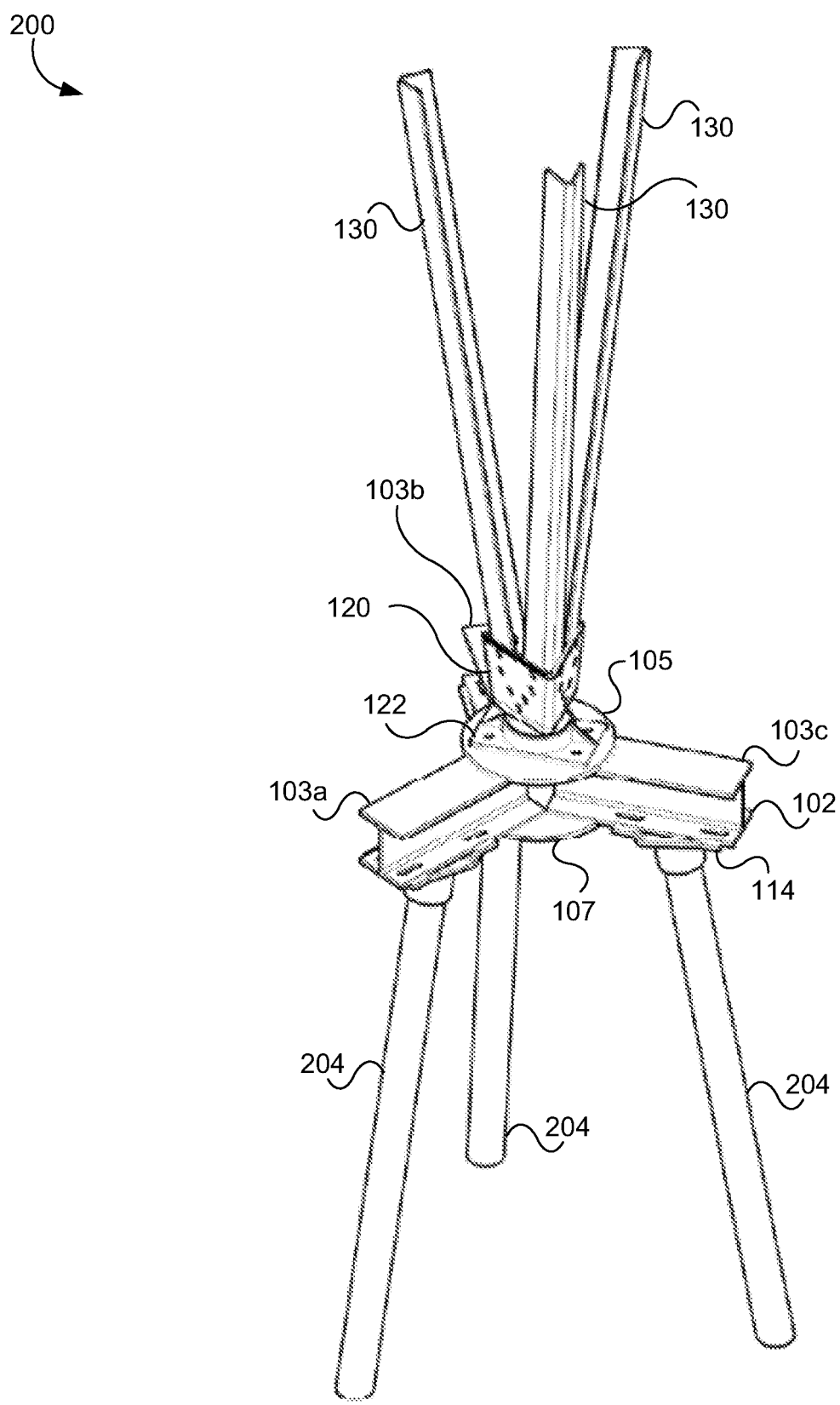
FIG. 2 is a perspective view of a transmission tower tripod and small pile configuration, according to an example implementation.

As shown in FIG. 2, some transmission towers 200 may have small pile configuration in which a transmission tower base 200 has a tripod 102 that is supported by small piles 204. Unlike the large piles 110, the small piles 204 may not support pile adapters 112, and thus the base of the tripod 102 may simply rest on brackets 114 positioned at the top of the small piles 204. As can be seen in FIG. 2, each tripod arm 103a,b,c of the tripod 102 may extend outwards away from a center point proximate the flower pot socket 122, such that each arm is positioned at a 120-degree angle relative to each adjacent arm on each side. As shown, in some embodiments, each tripod arm 103a,b,c may be an I-beam, W-beam or the like.

Figure 3:
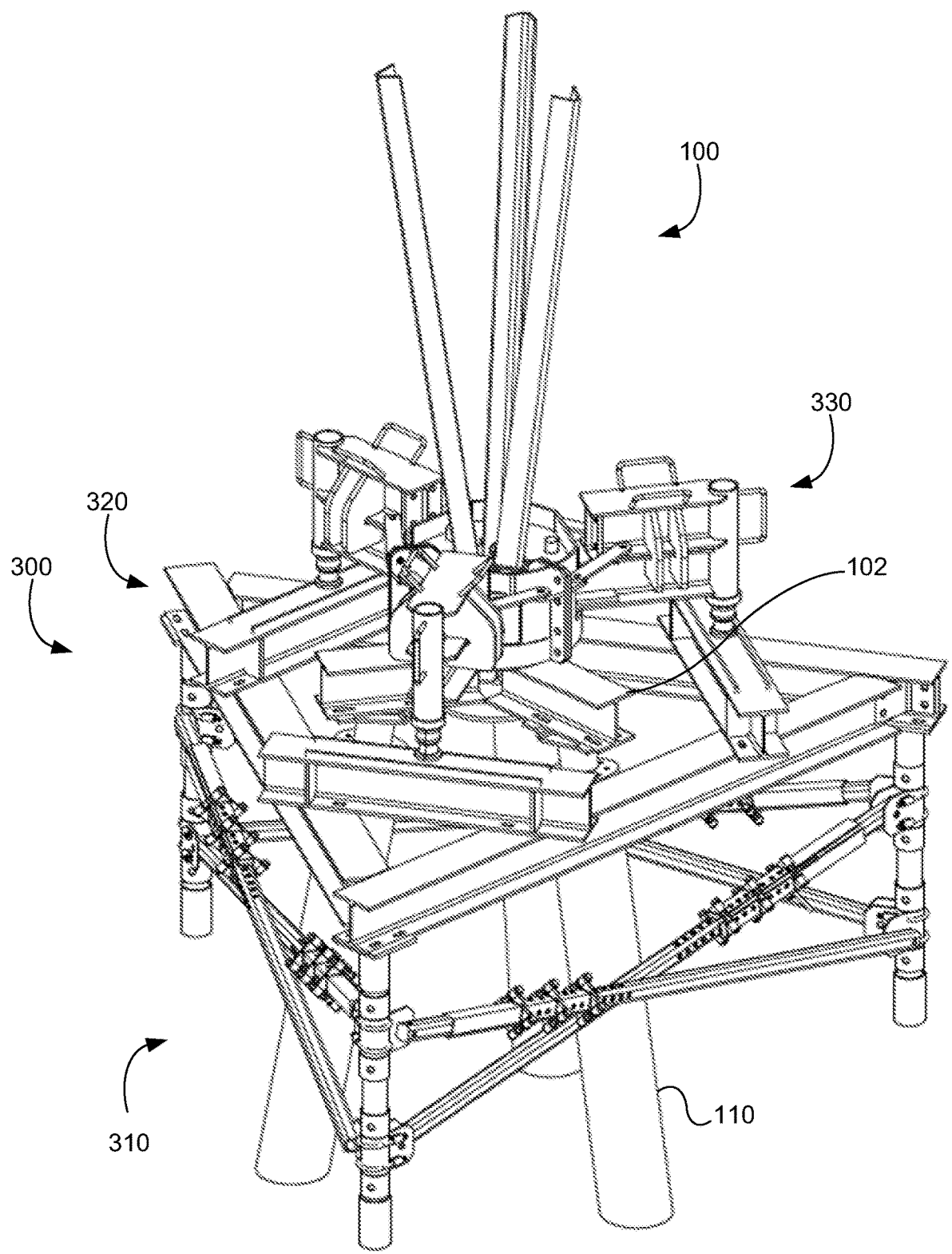
FIG. 3 is a perspective view of an assembled temporary support structure for a transmission tower supported by large piles, according to an example implementation.

FIG. 3 shows an embodiment of a temporary support structure 300 assembled around the base of a transmission tower 100 supported by large piles 110. According to some embodiments, the temporary support structure 300 may include a pile temporary support system 310, a beam support structure 320, and a flower pot adapter lifting assembly 330. As shown in FIG. 3, when assembled the temporary support structure 300 may support the beam support structure 320, which may in turn support the flower pot adapter lifting assembly. According to some embodiments, the flower pot adapter lifting assembly 330 may be configured to securely attach to the flower pot 120 of the transmission tower to remove the load of the transmission tower from the tripod 102 beneath. According to some embodiments, when the temporary support structure 300 is assembled around the base of the transmission tower 100 and attached to the flower pot 120, the flower pot adapter lifting assembly 330 may transfer the load of the tower from the flower pot 120 to the beam support structure 320, the beam support structure 320 may transfer the load to the pile temporary support system 310, and the pile temporary support system may transfer the load into the ground. In this way, the temporary support structure 300 may remove the load of the tower from the tripod 102 to allow the tripod 102 to be removed and replaced. As will be described further below, in some embodiments, the flower pot adapter lifting assembly 330 may be configured to vertically raise and/or lower the flower pot adapter 120 to provide access to the existing degraded tripod 102 and to allow installation of a new tripod 102.

Figure 4:
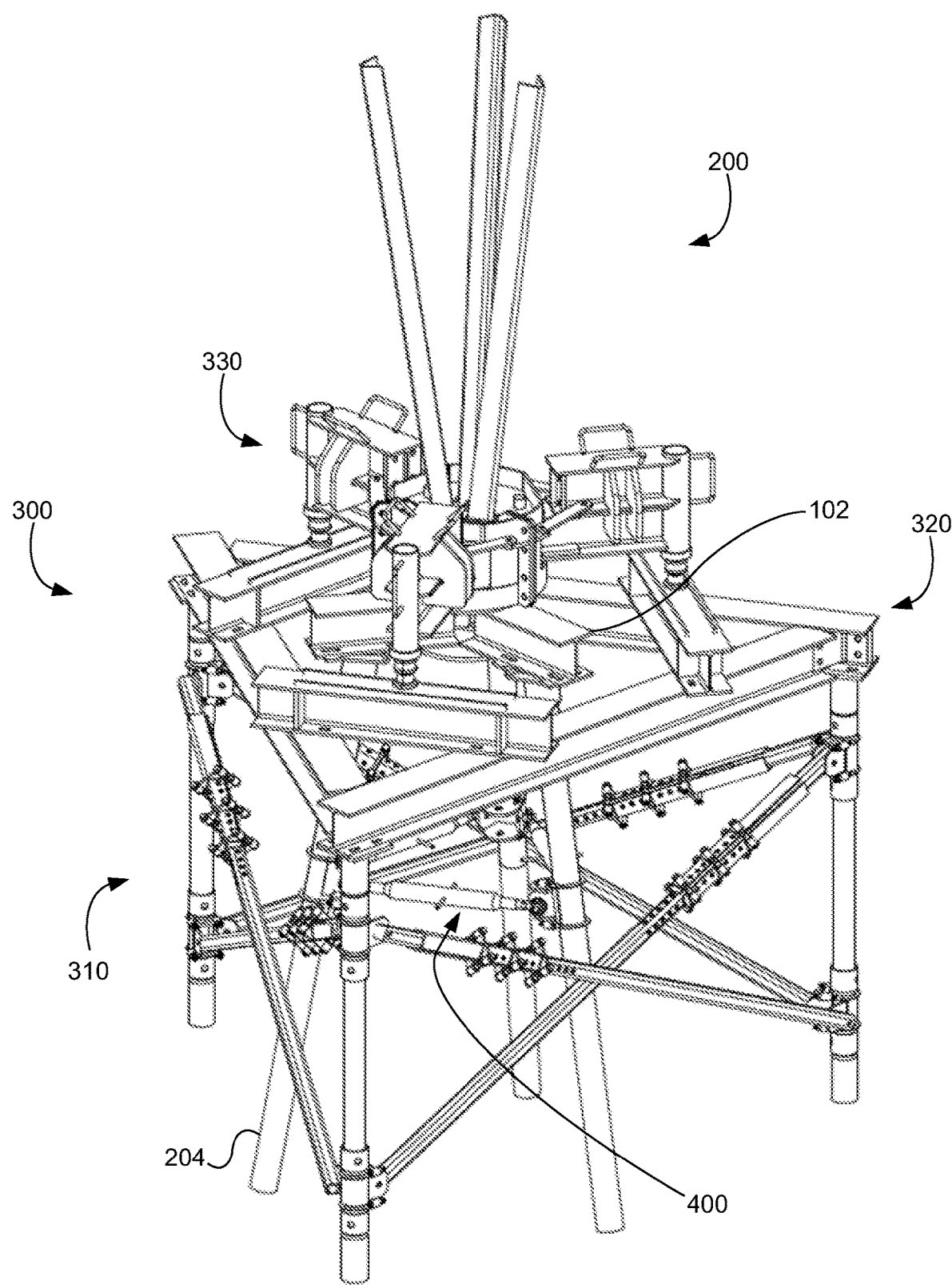
FIG. 4 is a perspective view of an assembled temporary support structure for a transmission tower supported by small piles having a small pile support structure, according to an example implementation.

FIG. 4 shows an embodiment of a temporary support structure 300 assembled around the base of a transmission tower 200 supported by small piles 204. When used with a transmission tower 200 supported by small piles 204, the temporary support structure 300 may be assembled and used in the same manner as described with respect to use with a transmission tower 100 supported by large piles 110. According to some embodiments, a temporary small pile strut assembly 400 may be attached to the small piles 204 to keep the small piles 204 in position when the tripod 102 is removed during the process of replacing the tripod 102. As shown by FIGS. 3 and 4, the temporary support system 300 for the small pile 204 configuration is exactly the same as the large pile 110 configuration, except that the temporary small pile strut assembly 400 may be used in conjunction with the small pile 204 configuration to provide additional stability to the small piles 204.

Figure 5:
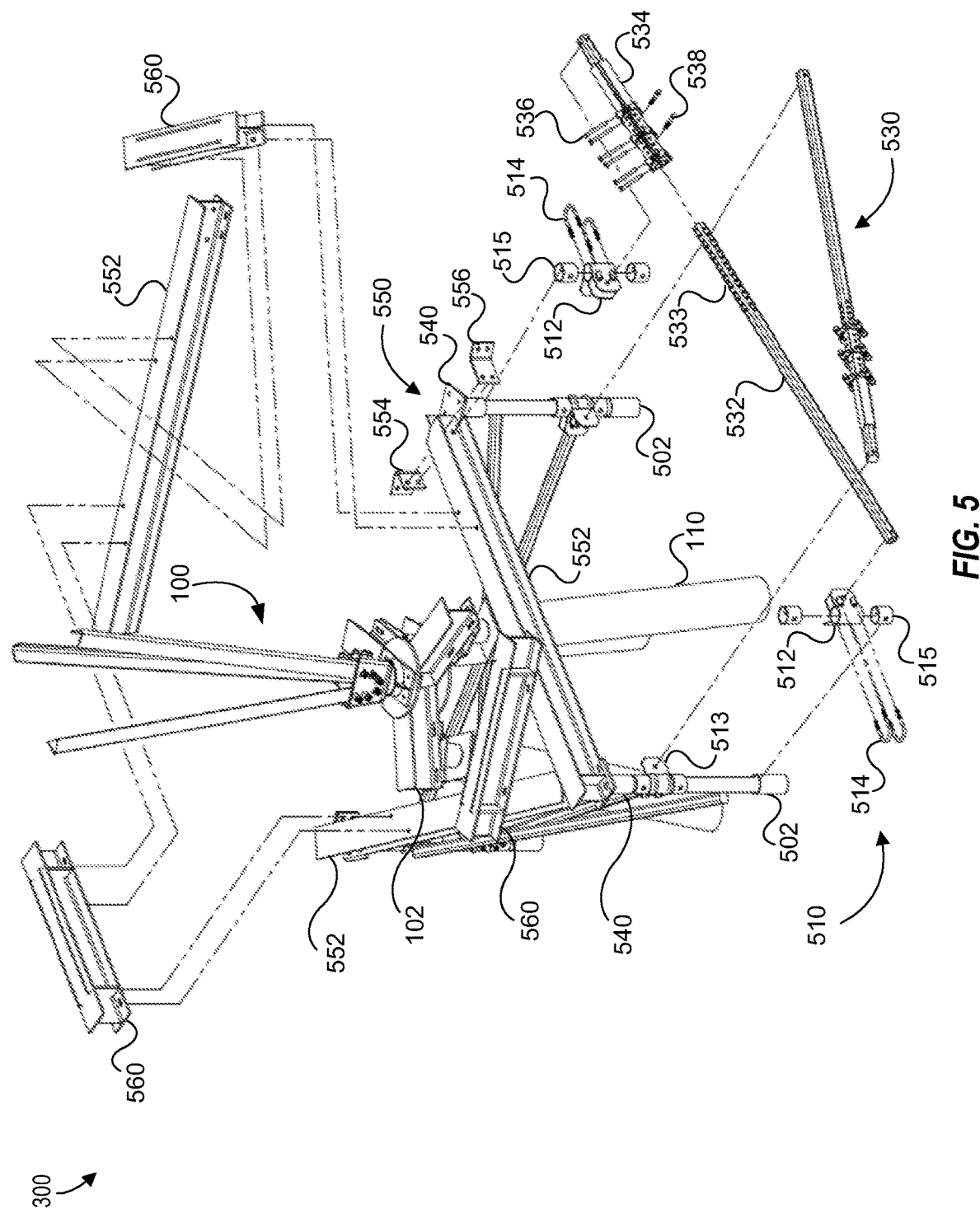
FIG. 5 is a partially exploded perspective view of an assembled temporary support structure for a transmission tower supported by large piles, according to an example implementation.

FIG. 5 shows a partially exploded view of an assembled temporary support structure 300 for a transmission tower 100 supported by large piles 110 or small piles 204. As shown in FIG. 5, a pile temporary support system 310 may include one or more of a plurality of temporary piles 502, temporary adjustable pile bracing bracket assemblies 510, temporary adjustable brace assemblies 530, and a plurality of temporary pile caps 540. According to some embodiments, a temporary pile 502 may be a rigid shaft, such as a premanufactured round shaft helical pile, that may provide a temporary load path to soils of sufficient capacity. In some embodiments, a temporary pile 502 may be constructed of multiple segments. As will be appreciated by those of skill in the art, temporary piles 502 may be driven into the ground such that they provide a steady vertical loading bearing support. According to some embodiments, the pile temporary support system 310 may include three temporary piles 502 that are positioned into the ground in an approximately equilateral triangular configuration around the base of the transmission tower 100, such that the flower pot 120 of the transmission tower is approximately positioned in the center of the temporary piles 502. Although this disclosure is generally directed to embodiments of a temporary support structure 300 having three temporary piles 502 that forms a triangular configuration, it is contemplated that other embodiments may utilize four or more temporary piles 502 in a square or other polygonal configuration, as may be necessary based on the number of outer sides presented by the flower pot 120. For example, if the flower pot 120 has four sides, a square configuration of a temporary support structure 300 with four temporary piles positioned in a square shape may be used.

According to some embodiments, a temporary adjustable pile bracing bracket assembly 510 may attach to a temporary pile 502 to provide an attachment point for cross-bracing between temporary piles 502. For example, in some embodiments, a temporary adjustable brace assembly 530 may attach to a temporary adjustable pile bracing bracket assembly 510 at each end to provide cross-bracing between the two temporary piles 502. According to some embodiments, a temporary adjustable pile bracing bracket assembly 510 may enable a temporary pile 502 to be installed and/or freely rotated with lower bracing connections attached. In some embodiments, a temporary adjustable pile bracing bracket assembly 510 may include a pile bracing bracket 512 and pile bracing bracket U-bolts 514. As shown in FIG. 5, a pile bracing bracket 512 may include a body having a ring-shaped portion configured to slide snuggly onto a temporary pile 502, with temporary pile shear sleeves 515 above and below the pile bracing bracket 512, and a brace receiving portion having one or more tabs 513 configured to securely receive one or more ends of one or more cross-bracing members, such as temporary adjustable brace assemblies 530. For example, in some embodiments, a pile bracing bracket 512 may have two tabs that are offset by an angle of approximately 60 degrees such that the pile bracing bracket 512 of a first temporary pile 502 may attach to two cross-bracing members positioned between each of a second and third temporary pile 502 positioned approximately in the shape of an equilateral triangle. Thus, in some embodiments, in a case where there are three temporary piles 502, each temporary pile 502 may connect to the other two via cross-bracing between each pair of temporary piles 502. As shown in FIGS. 3 and 4, in some embodiments, each temporary pile 502 may have an upper pile temporary adjustable pile bracing bracket assembly 510 attached and a lower temporary adjustable pile bracing bracket assembly 510 attached. According to some embodiments, two cross-bracing members (e.g., temporary adjustable brace assemblies 530) may be attached between each pair of temporary piles 502 where a first end of each cross-bracing member may be attached to the upper temporary adjustable pile bracing bracket assembly 510 of a respective temporary pile 502 and a second end of the cross-bracing member may be attached to the lower temporary adjustable pile bracing bracket assembly 510 of the respective adjacent temporary pile 502 such that the two cross-bracing members form an "X" pattern between the pair of temporary piles 502. As shown in FIGS. 3 and 4, in some embodiments, this pattern may be repeated such that each pair of temporary piles 502 has an "X" shaped cross-bracing between them. Such cross-bracing may provide lateral stability and support to the temporary piles 502 that may prevent the temporary piles 502 from shifting or rotating relative to one other.

According to some embodiments, a tab 513 may be a plate or a pair of plates separated by a space configured to receive the end of a cross-bracing member, that extends away from the body of the pile bracing bracket 512. The tab 513 may include one or more apertures for receiving a securing member, such a bolt, a screw, fastener, or the like, and may attach to the end of a cross-bracing member by, for example, inserting a bolt through the aperture(s) of the tab 513 and through one or more corresponding apertures of the cross-bracing member and securing the securing member with a nut or the like. According to some embodiments, the end of a cross-bracing member, such as the end of a temporary adjustable brace assembly 530 may be attached to the pile bracing bracket 512 (e.g., via the tab 513) such that the cross-bracing member may rotate about the pile bracing bracket 512. For example, if the cross-bracing member is secured by a bolt through the tab 513 as described above, then the cross-bracing member may be free to rotate about the bolt as a hinge, such that the opposing end of the cross-bracing member may be raised or lowered to different heights of an opposing temporary pile 502. This free rotation of the cross-bracing member may allow an attached cross-bracing member to be folded up prior to drilling or driving the temporary pile 502 into the ground. Thus, in some embodiments, a temporary pile 502 may be driven into the ground while a cross-bracing member is attached. This is advantageous because a temporary adjustable pile bracing bracket assembly 510 attached to a lower portion of a temporary pile 502 may be inaccessible for attachment of a temporary cross brace when the temporary pile 502 is driven into the ground. Thus, attachment of the cross-bracing member to the pile bracing bracket 512 with the temporary pile shear sleeves 515 installed above and below pile bracing bracket 512 prior to driving the temporary pile 502 into the ground may allow the attached cross-bracing member to be subsequently rotated into position with the pile bracing bracket 512 restrained from translating along the temporary pile 502 by the temporary pile shear sleeves 515 as the temporary pile 502, pile bracing bracket 512 and the upward folded cross bracing member are driven into their final position. Once the pile is driven, the cross brace (e.g., temporary adjustable brace assembly 530) may be folded down to be attached to another temporary pile 502, whereas a technician may otherwise be unable to access and attach the cross-bracing member after the temporary pile 502 has been driven into the ground absent the presence of the temporary adjustable pile bracing bracket assembly 510 disclosed herein. In some embodiments, a lower temporary pile bracing bracket assembly of one or more temporary piles 502 may have one or more cross-bracing members attached prior to the one or more temporary piles 502 being driving into the ground. According to some embodiments, the attached cross-bracing members may then be attached to an upper temporary adjustable pile bracing bracket assembly 510 of an adjacent temporary pile 502 following insertion of the temporary piles 502 into the ground. In some embodiments, the attached cross-bracing members may be attached to an upper temporary adjustable pile bracing bracket assembly 510 of an adjacent temporary pile 502 following the installation of the beam support structure 320. According to some embodiments, pile bracing bracket 512 may be configured to allow attachment of additional tabs 513 to support the attachment of additional cross-bracing members.

As described above, in some embodiments, each temporary pile 502 may have an upper temporary adjustable pile bracing bracket assembly 510 installed on an upper portion of the temporary pile 502 and a lower temporary adjustable pile bracing bracket assembly 510 installed on a lower portion of the temporary pile 502. A pile bracing bracket 512 may permit rotation of a temporary pile 502 during installation with lower bracing connections (i.e., a pile bracing bracket 512 attached to a lower portion of the temporary pile 502) attached. In some embodiments, pile bracing bracket U-bolts 514 may transversely engage a temporary pile 502 and may be inserted through apertures on either side of a pile bracing bracket 512, as shown in FIG. 5. In some embodiments, an upper U-bolt 514 and a lower U-bolt 514 may be attached to a pile bracing bracket 512 as shown. According to some embodiments, the play or "slop" between the pile bracing bracket 512 and the temporary pile 502 can be adjusted or removed by tightening a U-bolt 514 once temporary piles 502 have been driven into position. For example, in some embodiments, tightening a U-bolt 514 may draw pile bracing bracket 512 towards the surface of the temporary pile 502.

According to some embodiments, temporary pile shear sleeves 515 may be attached to a temporary pile 502 above and/or below the pile bracing bracket 512 to prevent linear movement of the pile bracing bracket 512 along the temporary pile 502 without restricting the temporary pile's 502 ability to rotate within the pile bracing bracket 512. According to some embodiments, the temporary pile shear sleeves 515 may be installed on a temporary pile 502 using a through-bolt installed through the temporary pile shear sleeve 515 and the temporary pile 502. Temporary pile shear sleeves 515 may also prevent pile bracing bracket 512 from binding as the temporary pile 502 is screwed into the correct elevation or removed following repairs.

According to some embodiments, a pair of temporary adjustable pile bracing bracket assemblies 510 may be attached to the ends of a cross-bracing member, such as a temporary adjustable brace assembly 530. In some embodiments, a temporary adjustable brace assembly 530 may be adjustable in length to account for actual field installed conditions. For example, a temporary adjustable brace assembly 530 may be adjusted to be longer or shorter in length in order to be positioned snuggly between a pair of temporary piles 502 as shown in FIG. 3 and attached to temporary adjustable pile bracing bracket assemblies 510. In some embodiments, a temporary adjustable brace assembly 530 may include an adjustment tube 532, a sleeve assembly 534, a clamp/spreader bolts 536, and through-bolts 538. According to some embodiments, an adjustment tube 532 may be a tube of a fixed length having a series of offset, cross-drilled through-holes 533. According to some embodiments, through-bolts 538 may be inserted into two aligned holes on both faces of the adjustment tube 532 and the sleeve assembly 534 and a through-bolt nut installed to prevent independent linear movement between the two. A through-bolt 538 may connect the adjustment tube 532 to a temporary adjustable pile bracing bracket assembly 510 as described above to allow the adjustment tube 532 to be rotated upwards during installation of the temporary pile 502. A through-bolts 538 may be secured by a nut. In some embodiments, a sleeve assembly 534 may provide length adjustment of the temporary adjustable brace assembly 530 by sliding along the drilled end of the adjustment tube 532. A double-acting clamping system may serve as a secondary compression or friction connection or as a spreader system to solidly clamp around the adjustment tube 532 or increase clearance around the adjustment tube 532. For example, in some embodiments, there may be a seam in the portion of the sleeve assembly 534 that slides over adjustment tube 532 and when clamp/spreader bolts 536 are tightened, the sleeve assembly 534 may compress around adjustment tube 532, creating a friction connection in addition to the through bolt shear connection. When the clamp/spreader bolts 536 are loosened, the seam may expand, allowing the sleeve assembly 534 to be adjusted or removed. Once the sleeve assembly 534 is positioned at a desired length, the sleeve assembly 534 may be bolted to a temporary adjustable pile bracing bracket assembly 510 and one or more (e.g., two) through-bolts 538 may be inserted two holes in the same face of the sleeve assembly 534 to provide sliding along the adjustment tube 532. According to some embodiments, if two holes of the adjustment tube 532 and the sleeve assembly 534 don't align, cross-drilled through-holes at the end of the sleeve assembly 534 may allow the sleeve assembly to be slid off of the end of the adjustment tube 532, rotated 90 degrees, and slid back onto the adjustment tube 532 for additional hole locations. Once the one or more through-bolts 538 are installed, the clamp/spreader bolts 536 may be tightened to securely clamp around the adjustment tube 532 to remove any play. The clamp/spreader bolts 536 may be used in double-acting clamping/spreader system of the sleeve assembly 534. According to some embodiments, when clamp/spreader bolts 536 are turned a first direction (e.g., clockwise), a clamping action may be provided, whereas when turned a second direction (e.g., counterclockwise) a spread action may be provided.

According to some embodiments, each of the temporary piles 502 may have a temporary pile cap 540 mounted on the top end. For example, a temporary pile cap 540 may slide onto and bear on the temporary pile 502. In some embodiments, a temporary pile cap 540 may be bolted to the bearing frame beam assembly 550 to provide a load path from the bearing frame beam assembly 550 to the temporary pile 502 and to prevent lateral translation of the bearing frame beam assembly 550 relative to the to the temporary pile 502. According to some embodiments, a temporary pile cap 540 may be through-bolted to the temporary pile 502.

In some embodiments, as shown in FIG. 5, the beam support structure 320 may include a bearing beam (or girder) assembly 550 and a plurality of transfer beams 560. In some embodiments, the bearing beam assembly 550 may include a plurality (e.g., three) of bearing frame beams (or girders) 552. According to some embodiments, the bearing frame beam assembly 550 may support the plurality of transfer beams 506. In some embodiments, a bearing frame beam assembly 550 may include a plurality of bearing frame beams 552, that may be connected together at each pair of adjacent bearing frame beam 552 ends with an acute bent plate 554 of a skewed double bent plate connection and an obtuse bent plate 556 of the skewed double bent plate connection. In some embodiments, each end of a bearing frame beam 552 may directly bear on a respective temporary pile cap 540, such that each temporary pile cap 540 may support an end of two adjacent bearing frame beams 552. The adjacent ends of a pair of bearing frame beams 552 may be rigidly connected to one another by attaching an acute bent plate 554 of a first bearing frame beam 552 to an obtuse bent plate 556 of the adjacent second bearing frame beam 552 to create a skewed double bent plate shear connection. As shown in FIG. 5, an acute bent plate 554 and/or an obtuse bent plate 556 may be attached to the web (i.e., the vertical center plate) of a bearing frame beam 552 by aligning one or more apertures of the bent plate with one or more apertures of the web and attaching them together with securing members such as bolts, screws, fasteners, or the like. The bearing frame beams 552 may connect to each other via bent plates 554, 556 to create a bearing frame beam assembly 550 that may be in the shape or a triangle (or any other such shape that mirrors the number of sides of the flower pot 120 and the number of temporary piles 502). Although connection of the bearing frame beams 552 is described with respect to the use of an acute bent plate 554 and an obtuse bent plate 556, it is contemplated that the bearing frame beams 552 may be connected using other means or methods, such as, for example, connecting the top plates and bolt joining beams to a larger pile cap. According to some embodiments, bearing frame beams 552 may be a steel beam such as a W-section beam, an I-beam, or the like. In some embodiments, one end of a bearing frame beam 552 may have apertures or bolt holes in the web (i.e., the vertical plate in the middle of the beam) and may be coped for a skewed double bent plate shear connection of the acute bent plate 554 and the obtuse bent plate 556. In some embodiments, the opposite end of the bearing frame beam may contain a stiffener and bolt holes in the web to accept the skewed double bent plate shear connection of an adjacent bearing frame beam 552 and slotted bolt holes in the bottom flange for mounting to a temporary pile cap 540. In some embodiments, the top flange of the bearing frame beam 552 may include slotted bolt holes to accommodate the attachment of a transfer beam 560. According to some embodiments, the acute bent plate 554 may be mounted to an interior web side of a coped end of the bearing frame beam 552. The obtuse bent plate 556 may be mounted to an exterior web side of a coped end of the bearing frame beam 552. The acute bent plate 554 may work in conjunction with the obtuse bent plate 556 to form a skewed double bent plate shear connection.

As shown in FIGS. 3-5, in some embodiments, three bearing frame beams 552 may be assembled and connected to one another to form a bearing beam assembly 550. The bearing beam assembly 550 may be attached to the three temporary pile caps 540 of the temporary piles 502 to form an approximately equilateral triangle around the base of the transmission tower 100. A plurality of transfer beams 560 may be assembled on top of the bearing frame beam assembly 550, by, for example, placing each transfer beam 560 across a respective portion of two bearing frame beams 552 as shown in FIG. 5. In some embodiments, each of the three transfer beams 560 may be placed across a pair of bearing frame beams 552 such that they intersect the bearing frame beams 552 at an approximately 60-degree angle. In some embodiments, each of the transfer beams 560 may be placed across a pair of bearing frame beams 552 such that each transfer beam 560 is aligned approximately parallel to a face of the flower pot 120 of the transmission tower 100. Each end of a transfer beam 560 may directly bear on the underlying pair of bearing frame beams 552. When the temporary support structure 300 has been fully assembled, the transfer beams 560 may serve to accept and transfer loads from the flower pot lifting assembly 330 to the bearing frame beam assembly 550. As shown in FIG. 5, in some embodiments, the top face of each transfer beam 560 may include ridges or fins to prevent the screw jacks of the flower pot lifting assembly 330 from sliding off of the transfer beam 560.

Figure 6:
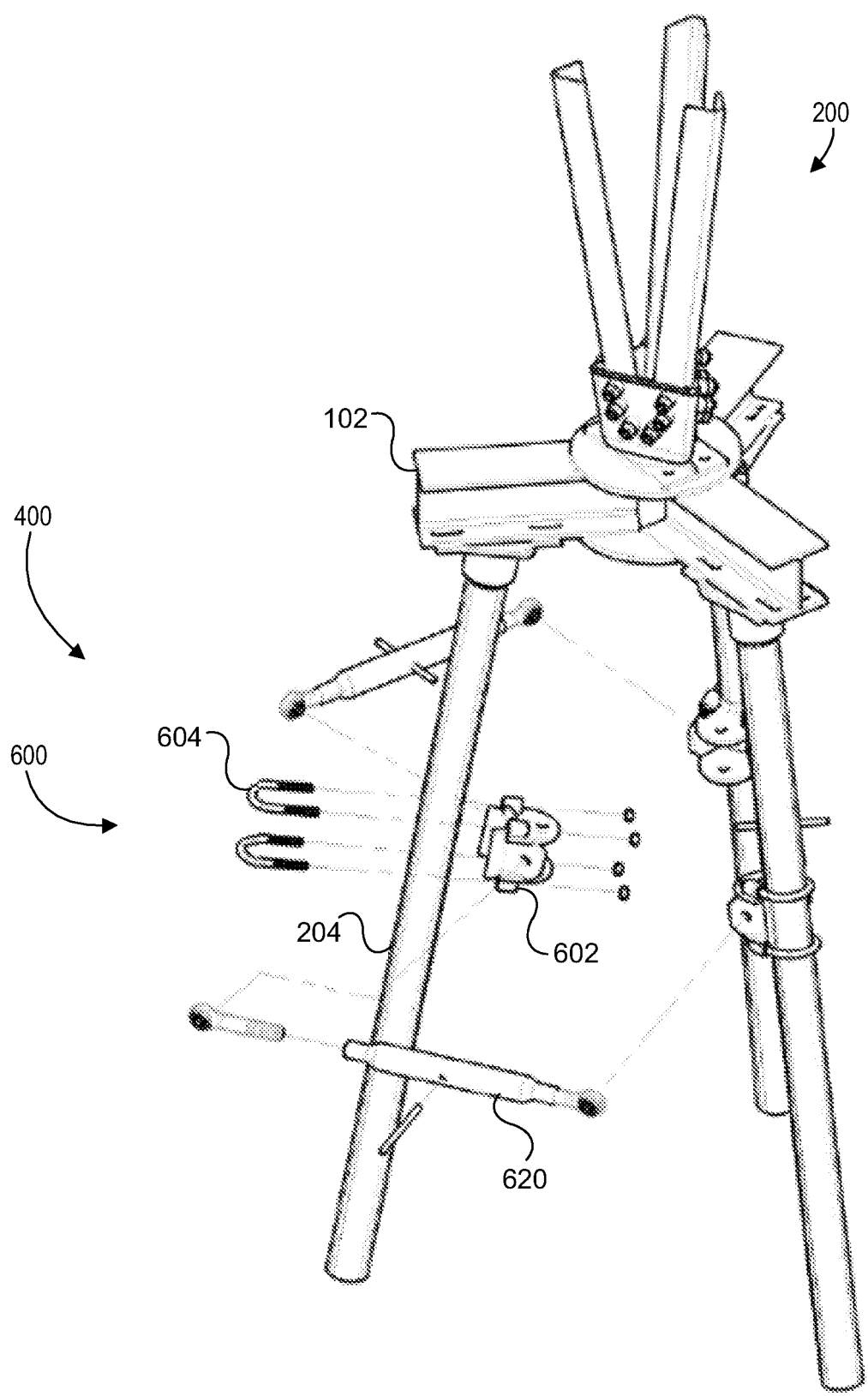
FIG. 6 is a partially exploded perspective view of a transmission tower tripod and small pile configuration having an attached temporary small pile strut assembly, according to an example implementation.

As mentioned previously above, the temporary support structure 300 may be used in conjunction with a transmission tower 200 supported by small piles 204. In such cases, the small piles 204 may require stabilization during the process of removing and replacing the tripod 102. FIG. 6 shows an embodiment of a temporary small pile strut assembly 400 that may be attached to small piles 204 to provide such stabilization. According to some embodiments, a temporary small pile strut assembly 400 may include a temporary strut bracket assembly 600 and a temporary strut assembly 620. According to some embodiments, the temporary strut bracket assembly 600 may connect a temporary strut assembly 620 to a small pile 204. In some embodiments the temporary strut bracket assembly 600 may include a temporary strut bracket 602 and temporary strut bracket U-bolts 604 or other suitable securing members. The temporary strut bracket 602 may provide attachment points for connecting temporary struts to the small piles 204. The temporary strut bracket 602 may include primary attachment holes for struts in side plates and alternate attachment holes in top and bottom plates. According to some embodiments, a temporary strut bracket 602 may fit around a small pile 204 and may be secured to the small pile 204 by the strut bracket U-bolts 604. The strut bracket U-bolts 604 may transversely engage the small pile 204. According to some embodiments, tightening the strut bracket U-bolt 604 nuts may draw the temporary strut bracket 602 against the surface of the small pile 204. In some embodiments, each end of a temporary strut assembly 620 may connect to a temporary strut bracket assembly 600 attached to a different small pile 204 to help prevent or control movement of the small piles 204. According to some embodiments, the temporary strut assembly 620 may include an articulating strut having a left-hand threaded ball joint rod end and a right-hand threaded ball joint rod end, an adjustment tube with matching threads, and an optional turning bar. In some embodiments, rotating the adjustment tube may lengthen or shorten the overall length of the strut. In some embodiments, a temporary strut assembly may be premanufactured.

Figure 7:
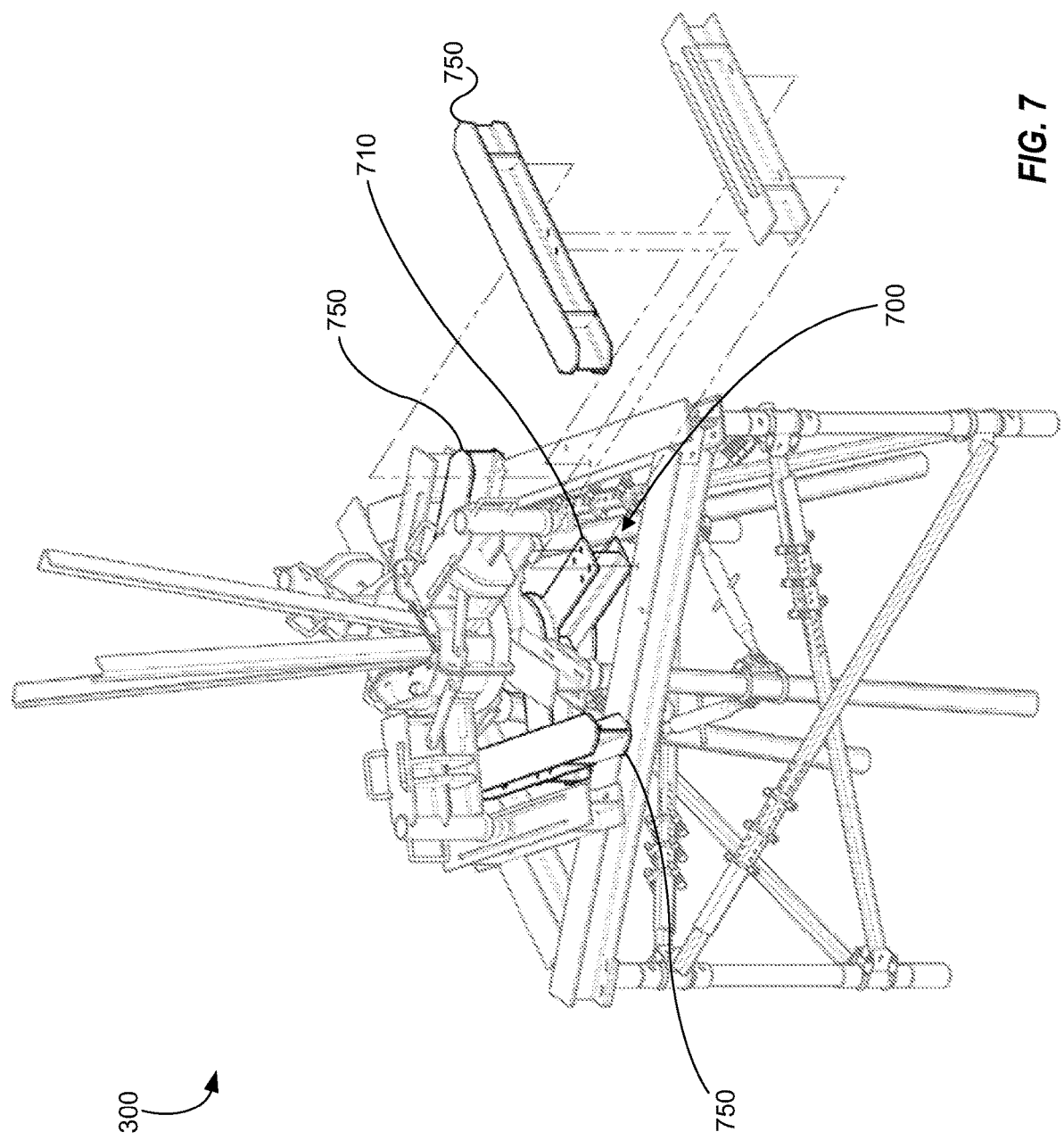
FIG. 7 is a partially exploded perspective view of an assembled temporary support structure for a transmission tower with underhung two-piece temporary tripod assembly, according to an example implementation.
Figure 8:
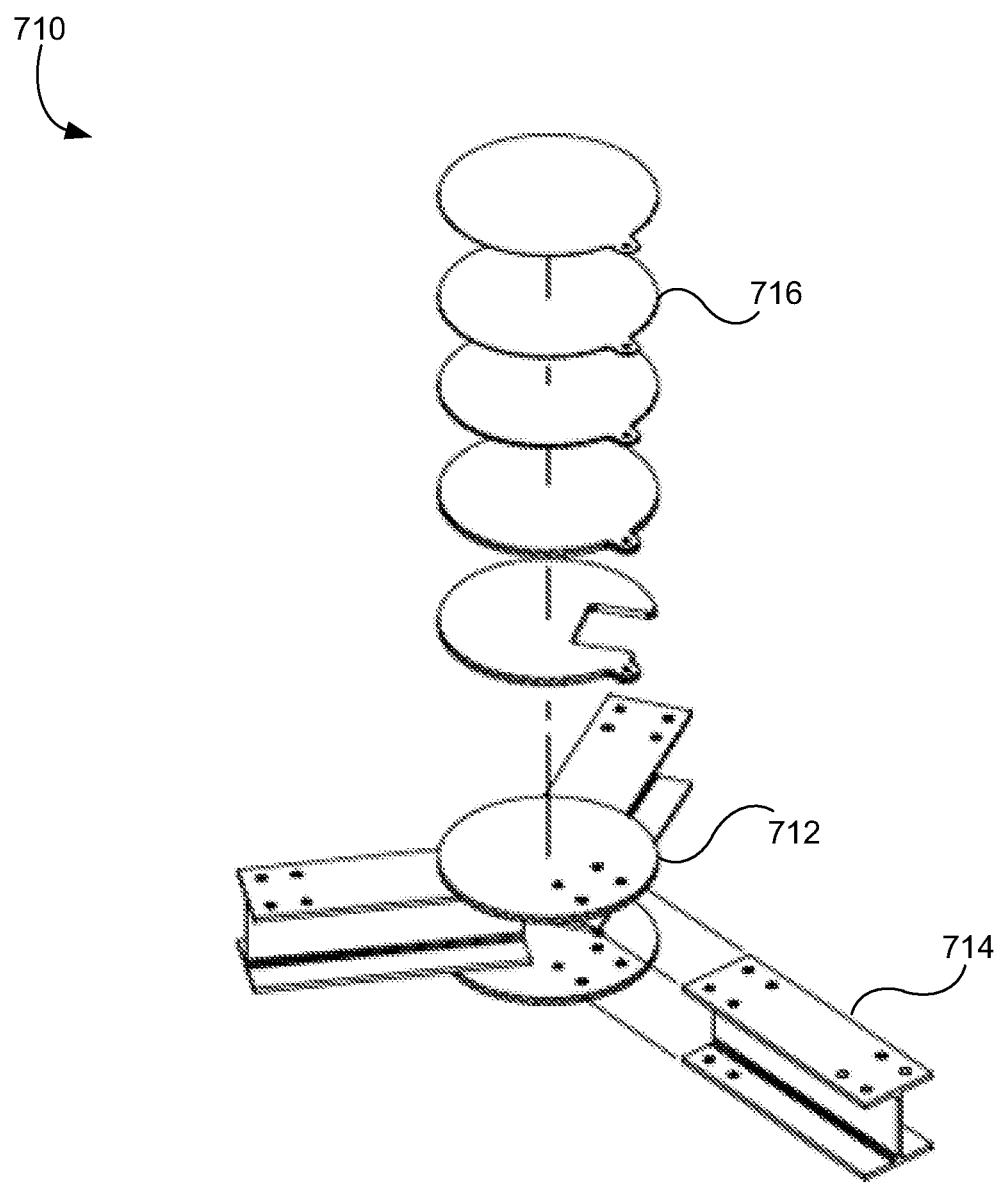
FIG. 8 is a partially exploded perspective view of an underhung two-piece temporary tripod assembly, according to an example implementation.

According to some embodiments, a tripod 102 of a transmission tower 100 may be so degraded that it may be determined by a technician that the tripod 102 cannot support the additional load of the flower pot adapter 920 and/or flower pot adapter beams 930 added to the flower pot 120 during assembly of the temporary support structure 300. In such cases, additional support may be added to the degraded tripod 102 using an underhung tripod assembly 700, as shown in FIG. 7. According to some embodiments, an underhung tripod assembly 700 may include an underhung two-piece temporary tripod assembly 710 and a plurality of temporary tripod transfer beams 750. Once installed, each of the temporary tripod transfer beams 750 may transfer loads from a beam of the temporary tripod to the bearing frame beam assembly 550. As shown in FIG. 7, a temporary tripod transfer beam 750 may be placed on top of a portion of a pair of bearing frame beams 552, in a manner similar to that as described above with respect to the transfer beams 560. According to some embodiments, when installed, the underhung two-piece temporary tripod assembly 710 may transfer loads from the degraded tripod 102 to the temporary tripod transfer beams 750. According to some embodiments, the underhung two-piece temporary tripod assembly 710 may be removed after all of the remaining components of the temporary support structure 300 have been installed such that the load of the existing tower 100 has been transferred from the degraded tripod 102 to the temporary support structure 300. As shown in FIG. 8, in some embodiments, the underhung two-piece temporary tripod assembly 710 may include a temporary tripod weldment 712, a temporary tripod bolt-in beam 714, and temporary tripod shim plates 716. The temporary tripod weldment 712 may include two tripod beams oriented at an approximately 120-degree from each other that are welded between two center plates as shown in FIG. 8. In some embodiments, the top flanges at the ends of the beams may contain apertures that may align with apertures of the temporary tripod transfer beams 750 to allow them to be bolted together. The center plates may include apertures configured to align with apertures of the temporary tripod bolt-in beam 714 to allow the temporary tripod bolt-in beam 714 to be bolted into the temporary tripod weldment 712 at an approximately 120-degree angle from the other two beams of the temporary tripod weldment 712. The temporary tripod bolt-in beam 714 may be a W-section beam, I-beam or the like, with one end containing apertures in the top and bottom flanges to align with apertures of the temporary tripod weldment 712 to allow attachment to the temporary tripod weldment 712 (e.g., via bolts). The opposite end of the temporary tripod bolt-in beam 714 may include apertures in the top flange to allow for a bolted connection to a temporary tripod transfer beam 750. According to some embodiments, the temporary tripod shim plates 716 may include a plurality of plates of different thicknesses to shim the gap between the top center plate of the underhung two-piece temporary tripod assembly 710 and the bottom center plate of the degraded tripod 102. In some embodiments, as shown in FIG. 8, the first shim plate may include a notch to provide clearance for the bolts (or other securing members) used to secure the temporary bolt-in beam 714 to the temporary tripod weldment 712. According to some embodiments, the temporary tripod shim plates 716 may each include an aperture configured to align with the aperture(s) of one or more other temporary tripod shim plates 716 to allow the temporary tripod shim plates 716 to be attached to one another using an attachment member such as a bolt, screw or fastener to prevent lateral movement of the shim plates 716 relative to one another. In some embodiments, the temporary tripod shim plates 716 may be steel plates.

Figure 9A:
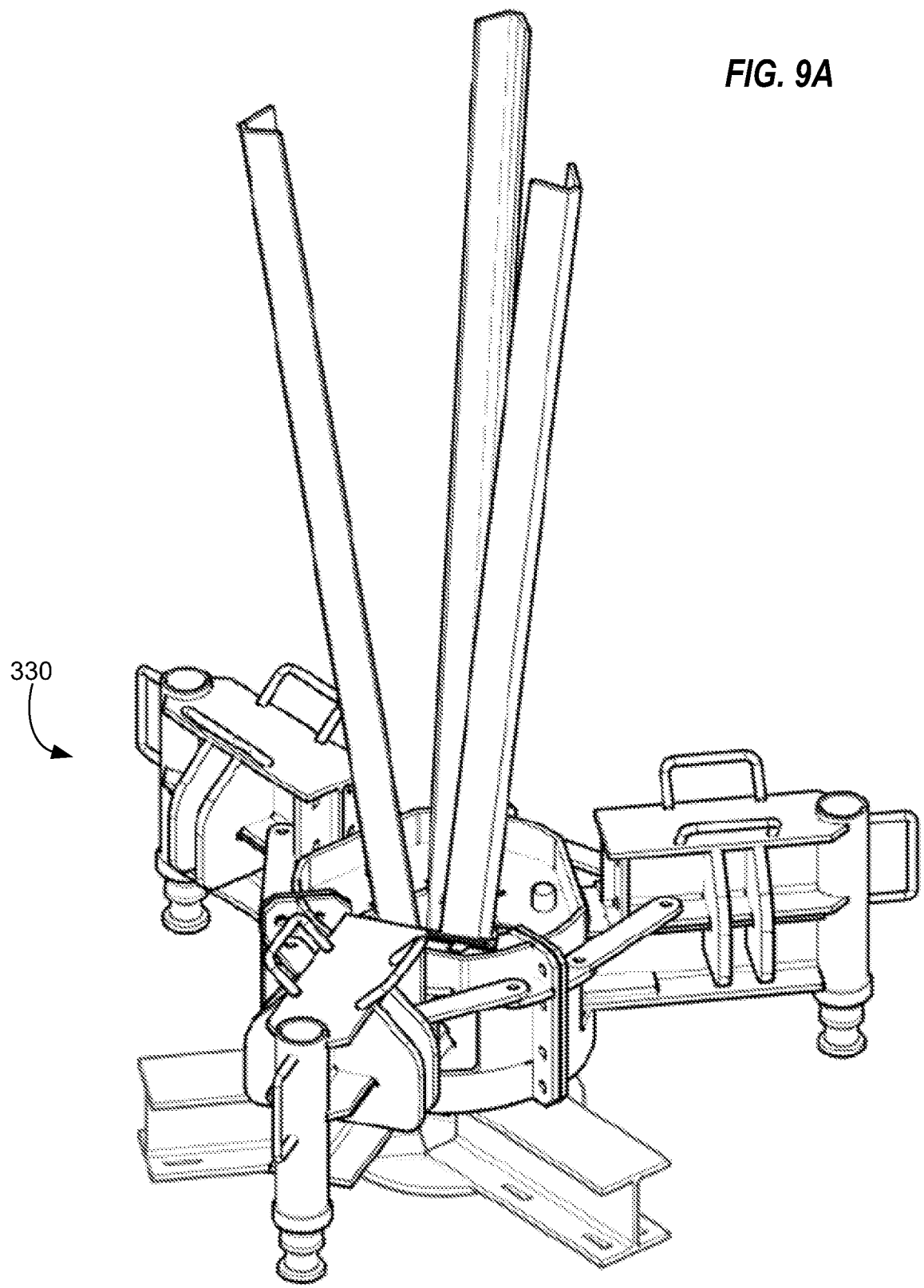
FIG. 9A is a perspective view of a flower pot adapter lifting assembly assembled around a flower pot of a transmission tower, according to an example implementation.
Figure 9B:
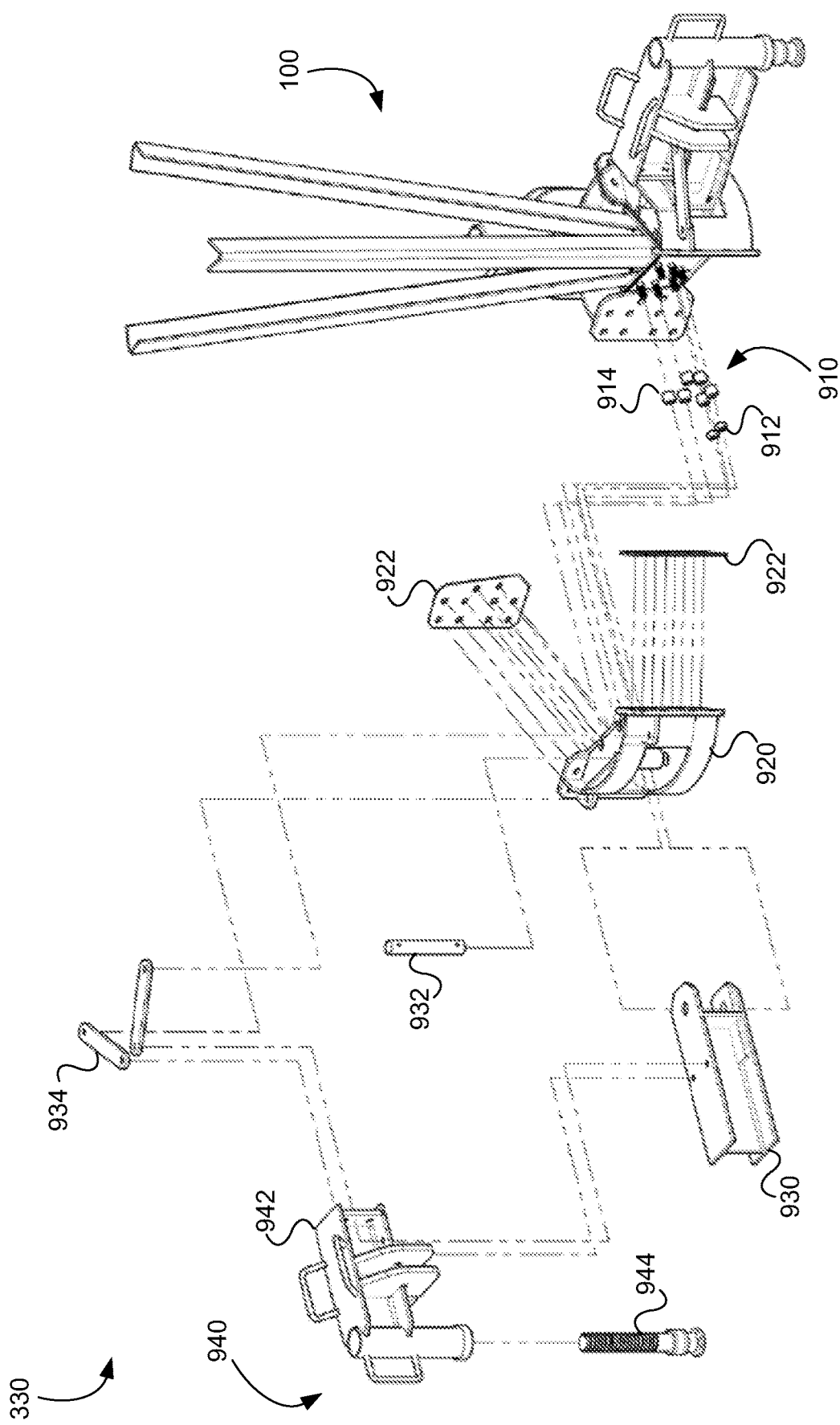
FIG. 9B is a partially exploded perspective view of a flower pot adapter lifting assembly assembled around a flower pot of a transmission tower, according to an example implementation.

FIG. 9A shows an embodiment of a flower pot adapter lifting assembly 330 that has been assembled around a flower pot 120 of a transmission tower 100. As shown in more detail in FIG. 9B, in some embodiments, a flower pot adapter lifting assembly 330 may include a plurality of flower pot adapters 920 that are each configured to securely attach to an outer face of the flower pot 120. The flower pot adapters 920 may provide a direct connection of the flower pot adapter lifting assembly 330 to the transmission tower 100. In some embodiments, a flower pot adapter 920 may engage temporary flower pot adapter bearing sleeves with fasteners 910 to the face of the flower pot 120. In some embodiments, the temporary flower pot adapter bearing sleeves with fasteners 910 may temporarily replace existing flower pot 120 fasteners and provide a bearing connection with a flower pot adapter 920. For example, in some embodiments, existing nuts and bolts of the flower pot 120 may be removed and replaced with threaded sleeves 914, studs, and nuts, threaded sleeves 914 and bolts, or unthreaded sleeves 912, bolts, and nuts, depending on their location. For example, space constraints may not allow a technician to insert a wrench head inside of the flower pot 120 to the lower bolts, so an unthreaded sleeve may be installed on the exterior of the lower bolts and the exterior nut may be tightened with an impact wrench that will tighten an exterior nut without having to turn the bolt head on the interior of the flower pot 120. As shown in FIG. 9B, the flower pot adapters 920 may include flower pot adapter bolt flanges and shims 922 to provide connections between adjacent flower pot adapters 920 around the flower pot 120. Shims may be used between the flanges to provide adjustment of the engagement relative to the faces of the flower pot 120. In some embodiments, each flower pot adapter 920 may be connected to a flower pot adapter beam 930 by a flower pot adapter pin 932, which may be an alloy steel pin, such as a premanufactured quick-release pin. A flower pot adapter pin 932 may be inserted into transverse throughholes at both ends of the flower pot adapter beam 930 to provide retention of the flower pot adapter beam 930 within the flower pot adapter 920. The flower pot adapter beam 930 may be engaged directly by a screw jack lifting beam assembly 940 and may provide a load path to the flower pot adapter 920. According to some embodiments, reinforced flanges at the connections to flower pot adapter pin 932 may provide increased bearing strength. In some embodiments, bolt holes in the top flange of flower pot adapter beam 930 may be used to restrain the screw jack lifting beam assembly 940 and connect flower pot adapter beam braces 934 which may prevent the pivoting of the flower pot adapter beam 930. As shown in FIG. 9B, flower pot adapter beam braces 934 may be attached to both a flower pot adapter beam 930 and a screw jack lifting beam 942 on one end, as well as a flower pot adapter 920 on the opposing end. In some embodiments, the flower pot adapters 920 may be attached to all sides of the flower pot 120 prior to the attachment of the flower pot adapter beams 930 and the screw jack lifting beam assemblies 940.

According to some embodiments, a screw jack lifting beam assembly 940 may include a screw jack lifting beam 942 and a screw and cap assembly 944. The screw jack lifting beam 942 may be configured to slide onto and directly engage the top flange of a flower pot adapter beam 930. According to some embodiments, bolts may be inserted through apertures in the bottom flange of the screw jack lifting beam assembly, apertures of the flower pot adapter beam braces 934 and apertures in the top flange of flower pot adapter beam 930 for retention of the screw jack lifting beam assembly 940 relative to the flower pot adapter beam 930. The screw jack lifting beam 942 may work in conjunction with the screw and cap assembly 944 to carry all of the load at the end of the flower pot adapter beam 930. According to some embodiments, the screw and cap assembly 944 may include a rod having a threaded screw portion (e.g., an Acme threaded screw) on one end and a ball bearing swivel cap on the other end. In some embodiments, the screw and cap assembly 944 may be premanufactured. The threaded screw portion may be configured to be rotatably received by a threaded shoulder nut (e.g., an Acme threaded shoulder nut) of the screw jack lifting beam 942. When the temporary support structure 300 is fully assembled, the ball bearing swivel cap may be positioned on top of a transfer beam 560 such that that load of the tower 100 may be transferred through a plurality of screw jack lifting beam assemblies 940 and into a corresponding plurality of transfer beams 560. According to some embodiments, the height of a screw jack lifting beam 942 may be raised by rotating the screw and cap assembly 944 in opposing directions. Thus, in some embodiments, once the flower pot adapter lifting assembly 330 is installed on top of the transfer beams 560 and in connection to the flower pot 120, the height of the transmission tower 100 may be raised or lowered in accordance with the raising and lowering of the plurality of screw jack lifting beam assemblies 940. In this way, the temporary support structure 300 may be configured to raise the tower to provide room to remove the degraded tripod 102 and lower the tower onto a newly installed tripod 102 following such installation.

Figure 10:
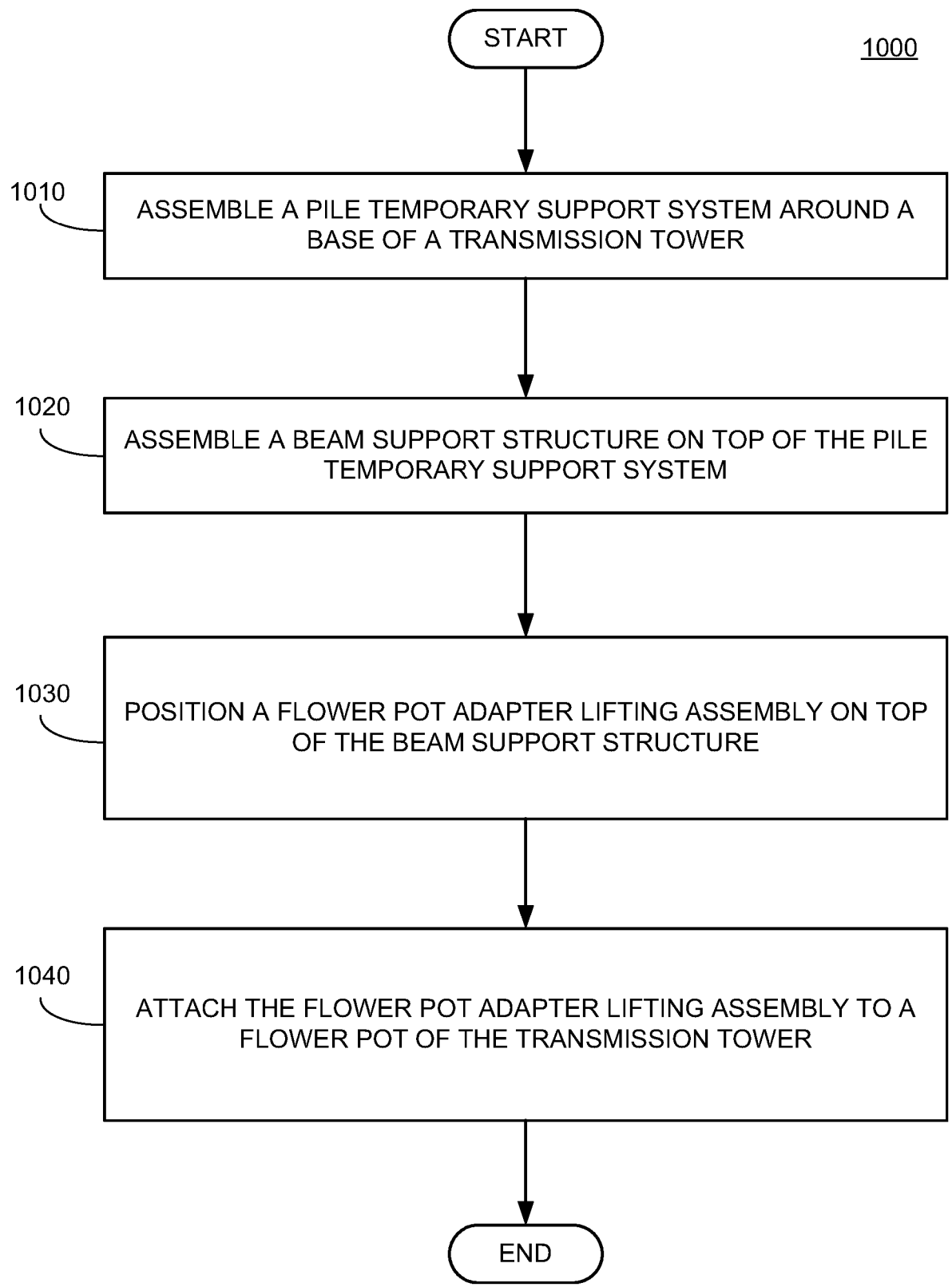
FIG. 10 is a flow diagram of a method, according to an example implementation.

FIG. 10 is a flow diagram of a method 1000, according to an example implementation. As shown in FIG. 10, in some implementations, the method includes, at 1010, assembling a pile temporary support system 300 comprising a plurality of piles 502 around a base of a transmission tower 100. In some embodiments, each of the plurality of piles 502 may have a base portion installed into the ground. For example, as will be appreciated by those of skill in the art, a pile may be driven or screwed into the ground. Each of the plurality of piles 502 may include a pile cap 540 on a top end of the pile 502, as described above.

According to some embodiments, assembling the pile temporary support system 300 may include attaching a first temporary adjustable pile bracing bracket assembly 510 to a first pile 502 of the plurality of piles 502, attaching a second temporary adjustable pile bracing bracket assembly 510 to a second pile of the plurality of piles 502, and attaching a temporary adjustable brace assembly 530 between the first temporary adjustable pile bracing bracket assembly 510 and the second temporary adjustable pile bracing bracket assembly 510. As previously described above, attachment of a lower temporary adjustable pile bracing bracket assembly 510 to a pile 502 and attachment of an end of a temporary adjustable brace assembly 530 to the lower temporary adjustable pile bracing bracket assembly 510 may occur prior to driving a lower portion of the pile 502 into the ground, as such lower portion may be inaccessible following the insertion of the lower portion of the pile 502 into the ground. Further, in some embodiments, attachment of the other end of the temporary adjustable brace assembly 530 to a temporary adjustable pile bracing bracket assembly 510 attached to an adjacent pile 502 may occur at a later time, such as following the installation of one or more bearing frame beams 552 and/or transfer beams 560. While the preceding describes the installation of two temporary piles 502 and the installation of cross bracing between them, it should be understood that the method contemplates installation of three temporary piles with the cross bracing attached between each pair of adjacent temporary piles 502 in a manner similar to that as described above to form a triangular configuration. In other words, each of the three temporary piles 502 may have a lower pile bracing bracket 512 attached to the pile 502 and two temporary adjustable brace assemblies 530 are attached to each lower pile bracing bracket 512 before the brace assemblies are folded up and the temporary piles 502 (with attached brace assemblies) are driven into the ground. Once the temporary piles 502 are installed in the ground, the temporary adjustable brace assemblies 530 may be folded down and may be attached to an upper pile bracing brackets 512 of a neighboring temporary 502, thereby creating an "X" cross brace between each pair of the temporary piles 502.

At 1020, the method can include assembling a beam support structure (e.g., beam support structure 320) on top of the pile temporary support system 310 such that the pile temporary support system 310 supports the beam support structure. In some embodiments, the beam support structure may include at least a first plurality of support beams, such as bearing frame beams 552 that may be assembled together to form a bearing frame beam assembly 550 as described previously above. For example, in some embodiments, these support beams may be attached to one another and to the temporary pile caps 540 as described previously above.

According to some embodiments, assembling the beam support structure may include, for each pair of adjacent piles 502 of the plurality of piles 502, placing a respective beam of the first plurality of support beams on top of the pile caps 540 of each of the piles 502 of the pair of adjacent piles 502 such that the first plurality of support beams form a substantially enclosed shape around the transmission tower 100 and securing each end of each respective beam of the first plurality of support beams to the pile caps 540 of the respective pair of adjacent piles 502. According to some embodiments, assembling the beam support structure may further include, for each pair of adjacent beams of the first plurality of support beams, placing a respective beam of a second plurality of support beams (e.g., transfers beams 560) on top of a portion of each of the respective pair of adjacent beams such that, according to some embodiments, the ends of each of the second plurality of beams may be positioned proximate to an adjacent beam of the second plurality of support beams. As shown in FIG. 5, each of the second plurality of support beams (e.g., transfer beams 560) may be securely attached to a pair of the first plurality of support beams (e.g., bearing frame beams 552) by inserting securing members, such as bolts, screw, fasteners or the like through apertures in the bottom flange of the support beam of the second plurality of support beams and apertures in the top flanges of the support beams of the first plurality of support beams. According to some embodiments, the second plurality of support beams may be supported by the first plurality of support beams and may form an approximately regular polygon around the transmission tower 100.

At 1030, the method can include positioning a flower pot adapter lifting assembly 330 on top of the beam support structure such that the beam support structure supports the flower pot adapter lifting assembly 330. For example, a flower pot adapter lifting assembly 330 may be positioned on top of a beam support structure 320 as described previously above.

According to some embodiments, positioning a flower pot adapter lifting assembly 330 on top of the beam support structure may include positioning a plurality of screw jack lifting beam assemblies 940 on top of the second plurality of support beams (e.g., transfer beams 560) such that a height-adjustable threaded screw of each of a plurality of screw jacks 940 is positioned on top of an upper surface of a respective beam of the second plurality of support beams.

At 1040, the method can include attaching the flower pot adapter lifting assembly 330 to a flower pot 120 of the transmission tower 100. In some embodiments, the flower pot 120 may be positioned of above the tripod 102 and may be configured to hold one of more legs 130 of the transmission tower 100 or the guyed lattice mast of the transmission tower. In some embodiments, in response to the installation of the flower pot adapter lifting assembly 330 on top of the beam support structure and in connection with the flower pot 120, the load of the transmission tower 100 may be transferred from the transmission tower 100 to the flower pot adapter lifting assembly 330, from the flower pot adapter lifting assembly 330 to the beam support structure, and from the beam support structure (e.g., beam support structure 320) to the pile temporary support system 310. In other words, when installed (i.e., when attached to the flower pot 120 and positioned on top of the beam support structure), the flower pot adapter lifting assembly 330 may create a load path from the transmission tower 100 to the temporary support system 300, bypassing the existing tripod 102 and enabling the transmission tower 100 to be raised and lowered to replace the tripod 102 and/or other degraded portions of the tower foundation. It should be understood that in some embodiments and as previously described above, attachment of a portion of the flower pot adapter lifting assembly 330 (e.g., flower pot adapters 920) to the flower pot 120 may occur prior to positioning the flower pot adapter lifting assembly 330 on top of the beam support structure.

According to some embodiments, attaching the flower pot adapter lifting assembly 330 to the flower pot 120 of the transmission tower 100 may include attaching a plurality of flower pot adapters 920 to external surfaces of the flower pot 120 such that the flower pot 120 is substantially surrounded by the plurality of flower pot adapters 920. In some embodiments, following the attachment of the plurality of flower pot adapters 920 to the flower pot 120, each of a plurality of screw jacks 940 may be attached to a respective flower pot adapter 920 (e.g., via a respective flower pot adapter beam 930).

According to some embodiments, the method may further include removing the tripod 102 and installing a new tripod 102. For example, removing the tripod 102 may include unbolting the tripod 102 from a flower pot socket 122 and/or one or more existing installed brackets 114 that are attached to existing pile adapters. In some embodiments, removing the existing tripod 102 may include cutting the existing tripod 102, the existing brackets 114 and/or the existing pile adapters 112 out of tower 100 and/or large piles 110. In some embodiments, installing a new tripod 102 can include installing a new pile adapter 112 to each pile 110 of a plurality of large piles 110, installing a new pile bracket 114 on each new pile adapter 112 (e.g., via mating the two pieces together), attaching tripod arms 103 of the new tripod 102 to the new pile brackets 114 (e.g., via securing members through aligned apertures of a pile bracket 114 and bottom plate 108 of a tripod arm 103), attaching a flower pot socket 122 to a top surface of the new tripod 102, and lowering, by manipulation of the height-adjustable threaded screw of each of the plurality of screw jacks 940, the flower pot 120 into the flower pot socket 122. The new tripod 102 and/or flower pot socket 122 may then be attached to the flower pot 120 by, for example, bolting, screwing or fastening them together (e.g., via aligned apertures in each). Following installation of the new tripod 102, the temporary support structure 300 may be deconstructed.

It will be understood that the various steps of any of the methods described herein are illustrative only, and that steps may be removed, other steps may be used, or the order of steps may be modified.

Certain embodiments of the disclosed technology are described above with reference to flow diagrams of systems and methods according to example embodiments of the disclosed technology. It will be understood that some blocks of the flow diagrams may not necessarily need to be performed in the order presented, or may not necessarily need to be performed at all, according to some embodiments of the disclosed technology.

While certain embodiments of the disclosed technology have been described in connection with what is presently considered to be the most practical embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A temporary support structure comprising:
a pile temporary support system comprising a plurality of piles, each of the plurality of piles comprising a base portion that is configured to be installed into the ground; and
a temporary tower support assembly comprising a beam support structure and a lifting system, the beam support structure being configured to be installed on top of and supported by the pile temporary support system and the lifting system being configured to (i) be installed on top of the beam support structure and (ii) attach to a portion of a transmission tower to transfer a load of the transmission tower to the beam support structure and onto the pile temporary support system.

2. The temporary support structure of claim 1, wherein the lifting system is configured to transfer the load of the transmission tower off of a tripod installed beneath a mast of the transmission tower.

3. The temporary support structure of claim 1, wherein the lifting system comprises a plurality of lifting assemblies, each lifting assembly having a height-adjustable portion configured to abut an upper surface of a portion of the beam support structure.

4. The temporary support structure of claim 3, wherein the lifting system further comprises a plurality of flower pot adapters, each flower pot adapter corresponding to a lifting assembly of the plurality of lifting assemblies and each flower pot adapter configured to removably attach to an outer surface of a flower pot of the transmission tower, the flower pot receiving at least a portion of a mast of the transmission tower.

5. The temporary support structure of claim 1, wherein the pile temporary support system further comprises one or more braces, each of the one or more braces configured to attach to a pair of piles of the plurality of piles.

6. The temporary support structure of claim 1, wherein the pile temporary support system further comprises one or more struts, each of the one or more struts configured to attach to a pair of piles of the plurality of piles.

7. The temporary support structure of claim 1, wherein each pile of the plurality of piles comprises a pile cap on an end of the pile opposite the base portion,
wherein each pile cap comprises an upper flat surface configured to support a portion of the beam support structure,
wherein each pile cap of the plurality of piles is configured to be positioned into an installed configuration in which each upper flat surface of each pile cap of the plurality of piles is approximately disposed in a shared horizontal plane such that the pile caps are approximately level with one another.

8. The temporary support structure of claim 7, wherein the beam support structure comprises:
a first plurality of support beams configured to be positioned atop the pile caps of the plurality of piles; and
a second plurality of support beams configured to be positioned on top of the first plurality of support beams.

9. The temporary support structure of claim 8, wherein each of the first plurality of support beams has a first end configured to be positioned on top of a first pile cap and a second end configured to be positioned on top of a second pile cap and each of the second plurality of support beams is configured to be positioned on top of a portion of each of two of the first plurality of support beams.

10. The temporary support structure of claim 8 further comprising an underhung tripod assembly comprising:
a third plurality of support beams; and
an underhung tripod having one or more underhung tripod legs configured to attach to a bottom surface of each of the third plurality of support beams.

11. The temporary support structure of claim 10, wherein each of the third plurality of support beams is configured to be positioned on top of a portion of each of two of the first plurality of support beams such that when installed the underhung tripod is positioned beneath a tripod installed in the transmission tower.

12. A method of removing a load from a tripod of a transmission tower to allow repair or replacement of the tripod, the method comprising:

assembling a pile temporary support system comprising a plurality of piles around a base of the transmission tower, each of the plurality of piles comprising a base portion installed into the ground; and
assembling a temporary tower support assembly by assembling a beam support structure on top of the pile temporary support system such that the pile temporary support system supports the beam support structure;
wherein the load is transferred from the transmission tower to the beam support structure and from the beam support structure to the pile temporary support system.

13. The method of claim 12, wherein assembling the temporary tower supporter further comprises attaching a flower pot lifting system to a flower pot of the transmission tower, the flower pot being positioned above the tripod and holding a mast of the transmission tower,
wherein the load is transferred from the tripod to the flower pot lifting system, from the flower pot lifting system to the beam support structure, and from the beam support structure to the pile temporary support system.

14. The method of claim 13 further comprising, prior to attaching the flower pot lifting system to the flower pot of the transmission tower, positioning the flower pot lifting system on top of the beam support structure such that the beam support structure supports the flower pot lifting system.

15. The method of claim 14, wherein positioning the flower pot lifting system on top of the beam support structure comprises positioning a plurality of lifting assemblies on top of the beam support structure such that a height-adjustable portion of each of the plurality of lifting assemblies is positioned on top of a portion of the beam support structure.

16. The method of claim 15, wherein attaching the flower pot lifting system to the flower pot of the transmission tower comprises:
attaching a plurality of flower pot adapters to respective external surfaces of the flower pot; and
attaching each of the plurality of lifting assemblies to a respective flower pot adapter.

17. The method of claim 12, wherein assembling the pile temporary support system comprises:
attaching a first temporary pile bracing bracket assembly to a first pile of the plurality of piles;
attaching a second temporary pile bracing bracket assembly to a second pile of the plurality of piles; and
attaching a temporary brace assembly between the first temporary pile bracing bracket assembly and the second temporary pile bracing bracket assembly.

18. The method of claim 12, wherein each of the plurality of piles comprises a pile cap on an end of the pile opposite the base portion,
wherein assembling the beam support structure on top of the pile temporary support system comprises:
for each pair of adjacent piles of the plurality of piles, placing a respective beam of a plurality of support beams on top of pile caps of each of the piles of the pair of adjacent piles; and
securing each end of each respective beam of the plurality of support beams to the pile caps of the respective pair of adjacent piles.

19. The method of claim 18, wherein the plurality of support beams is a first plurality of support beams,
wherein assembling the beam support structure on top of the pile temporary support system further comprises, for each pair of adjacent beams of the first plurality of support beams, placing a respective beam of a second plurality of support beams on top of a portion of each of the respective pair of adjacent beams such that the second plurality of support beams are supported by the first plurality of support beams.

\* \* \* \* \*